United States Patent
Cau Dit Coumes et al.

(10) Patent No.: US 9,711,248 B2
(45) Date of Patent: Jul. 18, 2017

(54) BINDER AND THE USE THEREOF FOR CONDITIONING WASTE CONTAINING ALUMINIUM METAL

(71) Applicant: COMMISSARIAT A L'ENERGIE ATOMIQUE ET AUX ENERGIES ALTERNATIVES, Paris (FR)

(72) Inventors: Celine Cau Dit Coumes, Tavel (FR); David Lambertin, Caderousse (FR); Pascal Antonucci, Meynes (FR); Maryline Charlot, Gaujac (FR)

(73) Assignee: COMMISSARIAT A L'ENERGIE ATOMIQUE AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/774,650

(22) PCT Filed: Mar. 11, 2014

(86) PCT No.: PCT/EP2014/054712
§ 371 (c)(1),
(2) Date: Sep. 10, 2015

(87) PCT Pub. No.: WO2014/140018
PCT Pub. Date: Sep. 18, 2014

(65) Prior Publication Data
US 2016/0019992 A1  Jan. 21, 2016

(30) Foreign Application Priority Data
Mar. 13, 2013  (FR) ..................................... 13 52233

(51) Int. Cl.
| | | |
|---|---|---|
| C04B 28/34 | (2006.01) | |
| G21F 9/30 | (2006.01) | |
| C04B 40/00 | (2006.01) | |
| G21F 9/36 | (2006.01) | |
| C04B 111/00 | (2006.01) | |

(52) U.S. Cl.
CPC ............... *G21F 9/30* (2013.01); *C04B 28/34* (2013.01); *C04B 28/342* (2013.01); *C04B 28/346* (2013.01); *C04B 40/0028* (2013.01); *G21F 9/36* (2013.01); *C04B 2111/00206* (2013.01); *C04B 2111/00767* (2013.01); *Y02W 30/91* (2015.05); *Y02W 30/92* (2015.05); *Y02W 30/94* (2015.05)

(58) Field of Classification Search
CPC ..... C04B 28/34; C04B 28/342; C04B 28/346; C04B 40/0028; C04B 2111/00206; C04B 2111/00767; G21F 9/165; G21F 9/30; G21F 9/304; G21F 9/36
See application file for complete search history.

(56) References Cited

U.S. PATENT DOCUMENTS

| | | | |
|---|---|---|---|
| 2,795,510 A | 6/1957 | Thompson | |
| 4,756,762 A | 7/1988 | Weill et al. | |
| 5,037,479 A | 8/1991 | Stanforth | |
| 5,242,488 A | 9/1993 | Stetson et al. | |
| 5,518,541 A * | 5/1996 | Fogel | C04B 28/34 106/690 |
| 5,595,597 A * | 1/1997 | Fogel | C04B 28/34 106/690 |
| 5,645,518 A | 7/1997 | Wagh et al. | |
| 5,718,757 A * | 2/1998 | Guillou | C04B 28/34 106/690 |
| 5,846,894 A | 12/1998 | Singh et al. | |
| 5,931,773 A | 8/1999 | Pisani | |
| 6,133,498 A | 10/2000 | Singh et al. | |
| 6,153,673 A * | 11/2000 | Lemos | C04B 28/34 106/823 |
| 6,153,809 A | 11/2000 | Singh et al. | |
| 6,805,740 B2 * | 10/2004 | Canac | C04B 28/34 106/690 |
| 2003/0127025 A1 * | 7/2003 | Orange | C04B 12/02 106/690 |
| 2013/0008355 A1 * | 1/2013 | Stokes | C04B 28/02 106/810 |
| 2013/0014670 A1 | 1/2013 | Lambertin et al. | |
| 2015/0232387 A1 | 8/2015 | Lambertin et al. | |

FOREIGN PATENT DOCUMENTS

| | | |
|---|---|---|
| CN | 101407400 A | 4/2008 |
| WO | 97/34848 | 9/1997 |
| WO | 2004/075207 A2 | 9/2004 |
| WO | 2009/068452 A1 | 6/2009 |
| WO | 2009/120629 A1 | 10/2009 |

OTHER PUBLICATIONS

Covill et al.,"Development of magnesium phosphate cements for encapsulation of radioactive waste", Adv. Applied Ceramics, vol. 110, pp. 151-156 (2011).
Glasser et al., "Calculation of Chemical Water Demand for Hydration of Calcium Sulfoaluminate Cement", Proc. 4th International Symposium on Cement and Concrete, Shanghai, China, vol. 28, No. 4, pp. 340-347 (2000).
Hayes et al., "Development of the Use of Alternative Cements for the Treatment of Intermediate Level Waste", Proc. Waste Management (WM'07) Conference, Tucson, USA (2007).
Langton et al., "Use of Cementitious Materials for SRS Reactor Facility In-Situ Decommissioning", Proc. Waste Management (WM'11) 2011 Conference, Phoenix, USA, pp. 1-15 (2011).
Matsuo et al., "LiNO3 Addition to Prevent Hydrogen Gas Generation from Cement-Solidified Aluminium Wastes", J. Nucl. Sci. Techn., vol. 32, pp. 912-920 (1995).

(Continued)

*Primary Examiner* — Anthony J Green
(74) *Attorney, Agent, or Firm* — Miles & Stockbridge P.C.

(57) ABSTRACT

The present invention relates to a binder composition comprising (i) a phospho-magnesium cement; (ii) a boron source; (iii) a lithium salt; and (iv) water and to its preparation method. The present invention also relates to the use of such a binder for confining wastes and notably nuclear wastes containing aluminum metal.

21 Claims, 1 Drawing Sheet

(56) References Cited

OTHER PUBLICATIONS

Odler, "Special Inorganic Cements, Modern Concrete Technology Series", Taylor & Francis, London, pp. 216-225 (2000).
Soudee et al., "Mechanism of setting reaction in magnesia-phosphate cements", Cem. Concr. Res., vol. 30, pp. 315-321 (2000).
Wagh et al., "Stabilization of Contaminated Soil and Wastewater with Chemically Bonded Phosphate Ceramics", Proc. Waste Management (WM'97), Tucson, USA, pp. 1-6 (1997).
Zhang et al., "Development of low pH systems forming magnesium silicate hydrate (M-S-H)", Cem. Concr. Res., vol. 41, pp. 439-442 (2011).
Zhou et al, "An Alternative to Portland Cement for waste encapsulation—The calcium sulfoaluminate cement system", J. Hazard. Mater., vol. 136, pp. 120-129 (2006).
French Search Report dated Jan. 16, 2014 for related French Application No. 1352233.
International Search Report dated Apr. 24, 2014 for related PCT Application No. PCT/EP2014/054712.

\* cited by examiner

BINDER AND THE USE THEREOF FOR CONDITIONING WASTE CONTAINING ALUMINIUM METAL

TECHNICAL FIELD

The present invention belongs to the field of conditioning nuclear wastes and more particularly to the field of conditioning wastes containing aluminium metal by immobilization.

The present invention proposes a binder composition and notably a cement, mortar or concrete composition, its preparation method and its use for confining waste containing aluminium metal in packages intended to be stored in a center for storing nuclear wastes.

STATE OF THE PRIOR ART

The dismantlement of old nuclear installations has, or will generate, radioactive wastes, some of them containing aluminium metal. These wastes have to be conditioned before their definitive storage, i.e. placed in a stable, monolithic and confining form.

Portland cement of the silico-calcium type is widely used for conditioning wastes of low and medium activity. Civil engineering has disclosed and put to use its intrinsic qualities: availability, modest cost, application simplicity, good mechanical strength and, generally stability over time. The field of radioactive wastes also draws a benefit from its basicity after hardening, which allows insolubilization of a large number of radionuclides. This basicity is on the other hand an obstacle for conditioning the aluminium.

Indeed, aluminium is oxidized with production of dihydrogen when it is put into contact with the mixing/batching solution. Passivation of the metal by surface deposition of alumina only actually occurs for pHs comprised between 3 and 9. In a more acid medium (Eq. 1) or in a more basic medium (case of Portland cement—Eq. 2), alumina is soluble and the corrosion of the metal continues until depletion of the reagents. The evolution of hydrogen resulting from this would be detrimental for the safety of the storage of the conditioned wastes.

$$2Al + 6H^+ \rightarrow 2Al^{3+} + 3H_2 \quad \text{(Eq. 1)}$$

$$2Al + 2OH^- + 2H_2O \rightarrow 2AlO_2^- + 3H_2 \quad \text{(Eq. 2)}$$

This is the reason why the acceptable amount of aluminium in the cemented waste is actually very low. As an example, the maximum surface area which may be incorporated into cemented packages of 330 L stored in the center of the Aube Département is of 0.1 $m^2$ (specification of the "Agence Nationale pour la gestion des Déchets Radio-actifs" (ANDRA) (National agency for handling radioactive wastes) ACO.SP.ASRE.99.001).

As a replacement for conventional silico-calcium cements, three types of mineral binders have been investigated for the conditioning of wastes containing aluminium metal: (1) ettringite cements, (2) phospho-magnesium cements and (3) silico-magnesium cements.

Ettringite cements have the common characteristic of forming by hydration of ettringite ($3CaO.Al_2O_3.3CaSO_4.32H_2O$) in a large amount. They may be obtained by mixing an aluminous cement with a calcium sulfate source, or from a sulfo-aluminous cement rich in ye'elimite.

It was shown that the corrosion of aluminium bars is significantly reduced in a sulfo-aluminous cement slurry as compared with that observed with a Portland cement [1-2]. Two additional explanations have been put forward:

1) The pH of the interstitial solution of a sulfo-aluminous cement slurry (comprised between 10 and 11 as long as the mineralogical assembly contains gypsum) is less than that of a Portland cement slurry (greater than 13), which reduces the corrosion rate of the aluminium;

2) The chemical water demand of the sulfo-aluminous binder (amount of water required for totally hydrating the anhydrous phases of the cement), which increases with its initial gypsum content, is greater than that of Portland cement [3]. Accordingly, the residual water amount in a sulfo-aluminous cement slurry having reached an advanced hydration level is reduced, and long term aluminium corrosion is thus limited.

Recently, an ettringite binder obtained by mixing molten cement and plaster was used within the scope of a dismantlement project on the site of Savannah River in the United States [4]. An injection grout intended for inertization of a reactor vessel containing internal parts in aluminium was formulated. The authors disclose an equilibrium pH of the hydrated material of 9.5 and very limited hydrogen evolvement by corrosion of the aluminium. About 92 $m^3$ of material were applied at the end of the year 2010.

Several reservations nevertheless have to be provided. First of all, the measurements of hydrogen evolvement resulting from corrosion of the aluminium were conducted over relatively short periods (up to 40 d) and remain to be validated on the longer term. Further, ettringite binders have a reduced interstitial solution pH as compared with Portland cement, but which remains outside the passivation range of aluminium (3-9). In the case of sulfo-aluminous cements, the pH of the pore solution initially comprised between 10 and 11, even increases by one unit after depletion of gypsum, which ought to increase corrosion of the aluminium. Therefore, even if hydration leads to self-drying of the material, resumption of corrosion of the aluminium cannot be excluded in the long run in the event of re-saturation of the porosity with water.

A phospho-magnesium cement consists of magnesium oxide calcined at a high temperature (of the hard-burnt or dead-burnt type) and of an acid phosphate salt soluble in water, which is most often diammonium monohydrogenphosphate. The magnesium oxide is available in powder form, while the phosphate salt may either be dissolved in the mixing/batching water or mixed under dry conditions with magnesium oxide. In the latter case, the application of phospho-magnesium cement is identical with that of Portland cement (mixing the cement with water).

When an ammonium salt is used, the main product formed, responsible for setting and hardening, is struvite $NH_4MgPO_4.6H_2O$ [5] according to equation 3:

$$MgO + (NH_4)_2HPO_4 + 5H_2O \rightarrow NH_4MgPO_4.6H_2O + NH_3 \quad \text{(Eq. 3)}$$

Secondary products may also be observed, such as dittmarite ($NH_4MgPO_4.H_2O$), schertelite (($NH_4)_2Mg(HPO_4)_2.4H_2O$) newberyite ($MgHPO_4.3H_2O$) and magnesium phosphate $Mg_3(PO_4)_2.4H_2O$. An amorphous or poorly crystallized phase may also precipitate from mixtures with very low doses of water [6].

The reaction of magnesium oxide with diammonium monohydrogenphosphate has the drawback of producing ammonia. This toxic gas evolvement may be avoided by using an alkaline phosphate salt (like $NaH_2PO_4$, $KH_2PO_4$, $Na_2HPO_4$, $K_2HPO_4$) instead of ammonium phosphate[7]. The counterpart is a lowering of the mechanical strength of the hardened material.

In the National Argonne Laboratory (NAL) in the USA, a material called Ceramicrete was developed for conditioning waste without any processing [8-13]. It is prepared by reaction between magnesium oxide and potassium dihydrogenphosphate ($KH_2PO_4$), which leads to the formation of the hydrate phase $MgKPO_4.6H_2O$ (MKP) according to equation (4) hereafter:

$$MgO + KH_2PO_4 + 5H_2O \rightarrow MgKPO_4.6H_2O \quad \text{(Eq. 4)}$$

The solution of $KH_2PO_4$, with a pH close to 4, has moderate acidity which facilitates its application. The reaction is highly exothermic. During the preparation of significant volumes of material, a self-catalytic phenomenon is observed: the produced heat increases the temperature of the slurry, which further accelerates the reaction, so that flash settings within a few minutes may be observed. A setting retardant such as boric acid or citric acid (typical dose from 1 to 2% of the mass of the binder) should then be added in order to control the setting and to limit heating-up.

The phospho-magnesium cement prepared from MgO and $KH_2PO_4$ in proportions defined by the reaction (Eq. 4) has a chemical water demand (the water required for totally hydrating the binder) corresponding to a W/C ratio of 0.51 (wherein C refers to the mass of $MgO+KH_2PO_4$). With such a ratio, it is possible to obtain a fluid slurry after kneading. Unlike Portland cement, it is therefore not necessary to overdose water relatively to the chemical demand in order to obtain good workability. Accordingly, the residual interstitial solution volume in a phospho-magnesium binder after reaction is generally very small.

It should be noted that addition of borate or boric acid is contemplated for controlling the reaction rate during the stabilization, in a phospho-magnesium cement, of a nuclear material comprising oxides or halides of actinides and/or of transuranium elements and/or hydrocarbons and/or acids contaminated with actinides and/or transuranium elements [8-13].

After reaction, a phospho-magnesium cement slurry has a compressive strength typically comprised between 20 and 30 MPa, a specific gravity of the order of 1.8 g/cm³, a low open porosity (of the order of 10 to 15% by volume), and an equilibrium pH comprised between 6 and 8 [14], located in the range of passivation of the aluminium.

This is the reason why a phospho-magnesium cement was also selected as a possible candidate for inertizing the reactor vessel containing internal parts in aluminium in the dismantlement project conducted on the site of Savannah River [15]. A formulation of the injectable mortar type was developed. Finally, it was not used for the targeted application.

Finally, it should be noted that phospho-magnesium cements are also the subject of investigations in Great Britain (collaboration between Amec Nuclear UK and the ISM laboratory (Immobilisation Science Laboratory) of Sheffield University) for conditioning MAGNOX wastes containing uranium metal [16]. As in the case of aluminium, these binders may give the possibility of limiting corrosion of uranium by the mixing/batching water.

Two recent studies refer to the development of a mortar based on a silico-magnesia cement for blocking electropositive metals such as magnesium or aluminium [17]. The material is prepared from magnesium oxide, magnesium carbonate, from fumed silica and siliceous sand. After hardening, it includes a phase of the M-S-H (magnesium hydrosilicate) type, associated with brucite or with residual fumed silica according to the proportions of the different reagents. The pH of its interstitial solution is close to 10, which allows considerable reduction in the production of hydrogen during the coating of an aluminium bar.

An alternative to the change in the binder chemistry consists of retaining a silico-calcium cement, but of adding to it a corrosion inhibitor for the aluminium. In 1995, a Japanese study showed that the corrosion of the aluminium in a material based on Portland cement may be strongly reduced by adding lithium nitrate [18]. According to the authors, the beneficial effect of lithium would result from the formation of an insoluble film of $LiH(AlO_2)_2.5H_2O$ at the surface of the metal. The stability over time of this passivation layer remains unknown.

Further, in the stabilization method described in [10], in order to reduce the exothermic nature of the reaction during the preparation of the phospho-magnesium cement, addition of a carbonate of a monovalent metal is contemplated, selected from potassium, sodium and lithium (equation 2 described in [10]) or addition of lithium dihydrogenphosphate (equation 3 described in [10]). However, even if boric acid may be used as a setting retardant, none of the exemplified formulations comprise this acid associated with lithium carbonate or with lithium dihydrogenphosphate.

The inventors set the goal of proposing a useful material for conditioning wastes containing aluminium metal alone or in the form of an alloy, said material not having the drawbacks of the materials of the prior art and/or having improved properties and notably in terms of compatibility with aluminium metal.

DISCUSSION OF THE INVENTION

With the present invention it is possible to attain the goal set by the inventors and therefore provide a cement formulation intended for inertization of wastes containing aluminium metal in pure or alloyed form, and which meets, when said formulation appears as a mortar, the following constraints:
- production of hydrogen by corrosion of the aluminium in the cement matrix is reduced as compared with existing solutions;
- the reactivity of the binder is under control, with an initial Vicat setting time of more than 3 h, and a final Vicat setting time of less than 24 h;
- the material has after kneading, sufficient fluidity in order to allow flow through a Marsh cone provided with a fitting of 12.5 mm;
- the material does not have any bleeding 24 h after setting;
- self-heating up of the binder during its hardening does not generate any degradation of the material such as, for example, cracking or creation of macroporosity subsequent to vaporization of the mixing/batching water;
- the material develops a compressive strength greater than 20 MPa after 90 d of curing under water at room temperature;
- the hardened material does not have any expansion or contraction which may affect its integrity (as a result of cracks) when it is kept at room temperature under water or in air; and
- the material has an interstitial solution pH comprised between 5 and 9.

These goals are attained by use of a suitable mixture of a phospho-magnesium cement, of a boron source, of a lithium salt, of a filler, of water and optionally sand and/or gravel.

Indeed, the work of the inventors gave the possibility of unexpectedly showing that simultaneous addition of a source of lithium and of a source of boron to a phospho-magnesium cement leads to interesting synergies for the targeted application:

corrosion of the aluminium and the hydrogen production resulting from this, are significantly reduced as compared with the existing solutions (see Example 1); and
the retardant effect of the boron source is reinforced by the lithium salt, whereas, if the latter compound is used alone, it does not have any significant influence on the setting of the cement (see example 3).

Therefore it is by the association of the phospho-magnesium cement, of the boron source and of a lithium salt that the present invention stands out with respect to previous investigations. Therefore, the present invention relates to a binder composition comprising:

(i) a phospho-magnesium cement;
(ii) a boron source;
(iii) a lithium salt; and
(iv) water.

Within the scope of the present invention, the remarkable characteristics of this composition may be utilized whether this composition appears as a grout, a mortar or a concrete.

The phospho-magnesium cement which may be used for the present invention may be any phospho-magnesium cement known to one skilled in the art. Advantageously, the phospho-magnesium cement applied within the scope of the invention consists of a magnesium source in the oxidized state and of a phosphate source.

By <<magnesium source in the oxidized state>>, is meant a compound comprising magnesium in the oxidation state of +II or a precursor of the latter. Any magnesium source in the oxidized state known to one skilled in the art may be used within the scope of the present invention. Advantageously, this magnesium source in the oxidized state is selected from the group consisting of magnesium oxide (MgO), magnesium hydroxide ($Mg(OH)_2$), magnesium carbonate ($MgCO_3$), magnesium hydroxycarbonate ($4MgCO_3.Mg(OH)_2.5H_2O$), magnesium chloride ($MgCl_2$), magnesium bromide ($MgBr_2$) or one of their mixtures. In particular, this magnesium source in the oxidized state is selected from the group consisting of magnesium oxide (MgO), magnesium hydroxide ($Mg(OH)_2$), magnesium carbonate ($MgCO_3$), magnesium hydroxycarbonate ($4MgCO_3.Mg(OH)_2.5H_2O$) or one of their mixtures.

When magnesium oxide is used as a magnesium source in the oxidized state in the composition according to the invention, the magnesium oxide appears as a magnesium oxide obtained by calcination at a high temperature. Advantageously, such a magnesium oxide is obtained by calcination of magnesium carbonate or of a brine rich in magnesium at a temperature comprised between 1,000° C. and 1,500° C. and notably between 1,100° C. and 1,400° C., for a period comprised between 15 min and 4 h, notably between 30 min and 3 h and in particular of the order of 1 h (i.e. 1 h±15 min).

Within the scope of the present invention, the magnesium source in the oxidized state may be used in a pure form (i.e. a purity of more than 90% and notably 95% expressed by mass). Alternatively, the magnesium source in the oxidized state may comprise at least one other element, typically selected from the group consisting of calcium, silicon, aluminium or iron, these elements generally being found as an oxide or hydroxide.

The source of magnesium in the oxidized state used within the scope of the present invention typically appears in powder form. Advantageously, this powder has a specific surface area, determined by the BET (<<Brunauer, Emett and Teller>>—nitrogen adsorption) method by using the apparatus Micromeritics ASAP 2020, of less than 4 $m^2/g$, notably less than 2 $m^2/g$ and in particular less than 1 $m^2/g$. As an example, the magnesium oxide used in the experimental part hereafter, i.e. Magchem® 10CR, has a specific surface area of 0.9 $m^2/g$.

Further, this powder, when applied in the composition according to the invention, has a grain size of less than 500 μm, and notably less than 100 μm. It should be noted that obtaining such a grain size may require a milling step before application in the composition according to the invention. As an example, 10% of the particles of the magnesium oxide used in the experimental part hereafter, i.e. Magchem® 10CR, have a diameter of less than 5 μm, 50% of them a diameter of less than 19 μm, and 90% of them a diameter of less than 46 μm.

By <<phosphate source>>, is meant a compound comprising a phosphate or a precursor of the latter. Advantageously, the phosphate source applied within the scope of the present invention is selected from the group consisting of phosphoric acid, orthophosphoric acid, pyrophosphoric acid, polyphosphoric acid, aluminium phosphate, calcium phosphate, magnesium phosphate, an alkaline metal phosphate, aluminium monohydrogenphosphate, calcium monohydrogenphosphate, magnesium monohydrogenphosphate, an alkaline metal monohydrogenphosphate, aluminium dihydrogenphosphate, calcium dihydrogenphosphate, magnesium dihydrogenphosphate, an alkaline metal dihydrogenphosphate, aluminium orthophosphate, calcium orthophosphate, magnesium orthophosphate, an alkaline metal orthophosphate, aluminium pyrophosphate, calcium pyrophosphate, magnesium pyrophosphate, an alkaline metal pyrophosphate, aluminium polyphosphate, calcium polyphosphate, magnesium polyphosphate, an alkaline metal polyphosphate, aluminium tripolyphosphate, calcium tripolyphosphate, magnesium tripolyphosphate, an alkaline metal tripolyphosphate, aluminium tetrapolyphosphate, calcium tetrapolyphosphate, magnesium tetrapolyphosphate, an alkaline metal tetrapolyphosphate or one of their mixtures. By <<alkaline metal>>, is meant an element of the first column of the Periodic Table of the Elements except for hydrogen, and, in particular an element selected from the group formed by lithium, sodium, potassium, rubidium and cesium. It should be noted that ammonium phosphate, di-ammonium phosphate as well as their derivatives such as ammonium or di-ammonium monohydrogenphosphate, dihydrogenphosphate, orthophosphate, polyphosphate, tripolyphosphate and tetrapolyphosphate may also be used within the scope of the present invention.

The phosphate source applied within the scope of the present invention is more particularly selected from the group consisting of phosphoric acid, aluminium phosphate, sodium phosphate, potassium phosphate, aluminium monohydrogenphosphate, sodium monohydrogenphosphate, potassium monohydrogenphosphate, aluminium dihydrogenphosphate, sodium dihydrogenphosphate, potassium dihydrogenphosphate or one of their mixtures.

The phosphate source applied within the scope of the present invention may appear as a liquid or solid. When it is in solid form, it typically appears in a powdery form. It should be noted that the phosphate source is soluble in the mixing/batching water of the binder according to the invention.

The boron source which may be used within the scope of the binder composition according to the invention may be any boron source known to one skilled in the art and, in particular, a boron source customarily used as a setting retardant in the field of phospho-magnesium binders.

Advantageously, the boron source which may be used within the scope of the binder composition according to the invention is selected from the group consisting of boric acid, metaboric acid, borax, a borate salt, a monohydrogenborate salt, a dihydrogenborate salt, a metaborate salt, a polyborate salt or one of their mixtures. The contemplated salts are in particular a borate of alkaline metal, a monohydrogenborate of an alkaline metal, a dihydrogenborate of an alkaline metal, a metaborate of an alkaline metal, a polyborate of an alkaline metal or one of their mixtures. The alkaline metals contemplated for the boron source are identical with those contemplated for the phosphate source.

The boron source applied within the scope of the present invention is, more particularly, selected from the group consisting of boric acid, cesium borate, rubidium borate, potassium borate, sodium borate, lithium borate, cesium monohydrogenborate, rubidium monohydrogenborate, potassium monohydrogenborate, sodium monohydrogenborate, lithium monohydrogenborate, cesium dihydrogenborate, rubidium dihydrogenborate, potassium dihydrogenborate, sodium dihydrogenborate, lithium dihydrogenborate, cesium metaborate, rubidium metaborate, potassium metaborate, sodium metaborate, lithium metaborate, cesium polyborate, rubidium polyborate, potassium polyborate, sodium polyborate, lithium polyborate or one of their mixtures. More particularly, the boron source applied in the binder composition according to the invention is boric acid.

The boron source applied within the scope of the present invention may appear as a liquid or solid. When it is in solid form, it typically appears in powder form. It should be noted that advantageously, the boron source is soluble in the water for mixing/batching the binder according to the invention.

The composition according to the invention also comprises a lithium salt. Any lithium salt known to one skilled in the art may be used within the scope of the present invention. Advantageously, such a lithium salt is selected from the group consisting of lithium nitrate, lithium carbonate, lithium sulfate, lithium phosphate, lithium triazole, lithium borate, lithium monohydrogenborate, lithium dihydrogenborate, lithium metaborate, lithium polyborate or one of their mixtures. In particular, the lithium salt applied within the scope of the present invention is selected from the group consisting of lithium nitrate, lithium carbonate, lithium sulfate, lithium phosphate or one of their mixtures. More particularly, the lithium salt applied in the binder composition according to the invention is lithium nitrate.

It should be noted that lithium borate, lithium monohydrogenborate, lithium dihydrogenborate, lithium metaborate and lithium polyborate are compounds which may be used not only as a lithium salt but also as a source of boron. In other words, in the binder compositions according to the invention comprising lithium borate, lithium monohydrogenborate, lithium dihydrogenborate, lithium metaborate and lithium polyborate, the boron source is a lithium salt.

The lithium salt applied within the scope of the present invention may appear as a liquid or solid. When it is in solid form, it typically appears in a powdery form. It should be noted that the applied lithium salt is advantageously soluble in the water for mixing/batching the binder according to the invention.

Advantageously, in the binder composition according to the present invention, the proportions of phospho-magnesium cement (notably a magnesium source in the oxidized state+a source of phosphate), of the boron source, of the lithium salt and of water are such that they satisfy at least any of the molar ratios hereafter and, in particular all these molar ratios:

the molar ratio between the elements Mg and P is comprised between 0.5 and 1.5 and, notably, comprised between 0.8 and 1;

the molar ratio between the elements B and Mg is comprised between 0.03 and 0.3 and notably, comprised between 0.05 and 0.15;

the molar ratio between the elements Li and Mg is comprised between 0.02 and 0.12 and notably comprised between 0.05 and 0.10, and the molar ratio between water and the element Mg is comprised between 4 and 7 and notably comprised between 5 and 6.

The composition according to the invention may also comprise a filler. As a reminder, fillers also called <<fines>> or <<addition fines>> are a finely divided dry product stemming from cutting, sawing or working of natural rocks, of granulates, of ornamental stones or calcined minerals or from substitution materials, notably calcined by-products or residues of industrial utilization. In the composition according to the invention, the filler is used for diluting the other elements of the composition, in order to improve the mechanical strength of the obtained binder, in order to improve the workability of the fresh material and/or for reducing the risk of bleeding.

Advantageously, the filler applied in the composition according to the invention has an average grain size notably comprised between 1 and 200 µm and notably between 5 and 100 µm.

The filler used in the composition according to the invention may be any type of filler customarily used in the field of mortars, cements and concretes. Advantageously, the filler of the composition according to the invention is a siliceous and notably alumino-siliceous filler. Such a filler more particularly is a natural or artificial filler from pozzolan, illite, opaline, cherts, volcanic ashes, pumice stone, schistous clays, calcined diatomaceous earths, baked clay, silica fumes or flying ashes. In particular, the flying ashes which may be used as a filler in the composition according to the present invention are alumino-siliceous flying ashes, typically stemming from combustion of bituminous coals.

In the binder composition according to present invention, the amount of filler is such that the mass ratio between the filler and the phospho-magnesium cement (magnesium source+phosphate source) is comprised between 0.5 and 1.5 and notably comprised between 0.8 and 1.2.

The composition according to the invention may further comprise sand and optionally granulates.

The sand used in the composition according to the invention may be any type of sand customarily used in the field of mortars, cements and concretes. Advantageously, this is a siliceous sand which gives the possibility of attaining the best results as regards optimization of the physical and mechanical properties of the obtained binder. By <<siliceous sand>>, within the scope of present invention, is meant a sand consisting of more than 90%, notably more than 95%, in particular more than 98% and most particularly of more than 99% of silica ($SiO_2$). The siliceous sand applied in the present invention advantageously has an average grain size notably less than 10 mm, notably less than 7 mm and in particular less than 4 mm. As a particular example, it is possible to use a siliceous sand having an average grain size comprised between 0.1 and 2 mm.

By <<granulate>>, is meant a granular, natural, artificial or recycled material for which the average grain size is advantageously comprised between 10 and 125 mm. The granulate optionally added to the composition according to the present invention may be a siliceous granulate.

When the binder composition according to the invention comprises sand, the mass ratio between the sand and the phospho-magnesium cement (magnesium source+phosphate source) is advantageously comprised between 0.5 and 3 and, notably comprised between 1 and 1.5.

In a first embodiment, the binder composition according to the present invention comprises:
(i) a phospho-magnesium cement notably as defined earlier;
(ii) a boron source notably as defined earlier;
(iii) a lithium salt notably as defined earlier;
(iv) a filler notably as defined earlier; and
(v) water.

The binder composition according to this first embodiment essentially comprises the five aforementioned elements and advantageously is formed by these elements i.e. the composition according to the invention does not comprise any element other than the aforementioned five elements. In this case, the binder is a grout.

A particular example of a composition according to this first embodiment is a grout composition formed with:
(i) a phospho-magnesium cement formed by magnesium oxide calcined between 1,000 and 1,500° C., with a specific surface area of less than 1 m$^2$/g and with potassium dihydrogenphosphate;
(ii) boric acid;
(iii) lithium nitrate;
(iv) a filler consisting of alumino-siliceous flying ashes; and
(v) water.

In a second embodiment, the binder composition according to the present invention comprises:
(i) a phospho-magnesium cement notably as defined earlier;
(ii) a boron source notably as defined earlier;
(iii) a lithium salt notably as defined earlier;
(iv) a filler notably as defined earlier;
(v) water; and
(vi) sand notably as defined earlier.

The binder composition according to this second embodiment essentially comprises the aforementioned six elements and advantageously is formed with these elements, i.e. the composition according to the invention does not comprise any element other than the aforementioned six elements. In this case, the binder is a mortar.

A particular exemplary composition according to this second embodiment is a mortar composition formed with:
(i) a phospho-magnesium cement formed with magnesium oxide calcined between 1,000 and 1,500° C., with a specific surface area of less than 1 m$^2$/g and with potassium dihydrogenphosphate;
(ii) boric acid;
(iii) lithium nitrate;
(iv) a filler consisting of alumino-siliceous flying ashes;
(v) water; and
(vi) siliceous sand with a grain size of less than 2 mm.

In a third embodiment, the binder composition according to the present invention comprises:
(i) a phospho-magnesium cement notably as defined earlier;
(ii) a boron source notably as defined earlier;
(iii) a lithium salt notably as defined earlier;
(iv) a filler notably as defined earlier;
(v) water;
(vi) sand notably as defined earlier; and
(vii) a granulate notably as defined earlier.

The binder composition according to this third embodiment essentially comprises the aforementioned seven elements and advantageously is formed with these elements, i.e. the composition according to the invention does not comprise any element other than the aforementioned seven elements. In this case, the binder is a concrete.

A particular exemplary composition according to this third embodiment is a concrete composition formed with:
(i) a phospho-magnesium cement formed with magnesium oxide calcined between 1,000 and 1,500° C., with a specific surface area of less than 1 m$^2$/g and with potassium dihydrogenphosphate;
(ii) boric acid;
(iii) lithium nitrate;
(iv) a filler consisting of alumino-siliceous flying ashes;
(v) water;
(vi) siliceous sand with a grain size of less than 2 mm; and
(vii) a siliceous granulate.

The present invention relates to a method for preparing a binder composition as defined earlier.

This method comprises the steps of:
a) preparing a mixture comprising the water notably as defined earlier, the boron source notably as defined earlier, the lithium salt notably as defined earlier, the phospho-magnesium cement notably as defined earlier and the filler notably as defined earlier; and
b) kneading the obtained mixture subsequent to step (a).

Many alternatives may be contemplated for step (a) of the method according to the invention, all these alternatives are routine work for one skilled in the art. Thus, a first alternative of step (a) of the method according to the invention comprises the sub-steps of:
$a_1$) preparing a first mixture comprising the water as defined earlier, the boron source notably as defined earlier and the lithium salt notably as defined earlier; and
$a'_1$) adding the phospho-magnesium cement notably as defined earlier and the filler notably as defined earlier, to the mixture prepared during step ($a_1$).

A second alternative of step (a) of the method according to the invention comprises the sub-steps of:
$a_2$) preparing a first mixture comprising the boron source notably as defined earlier, the lithium salt notably as defined earlier; the phospho-magnesium cement notably as defined earlier and the filler notably as defined earlier and
$a'_2$) adding the water notably as defined earlier, to the mixture prepared during step ($a_2$).

The mixing during step ($a_2$) may notably be dry mixing.

A third alternative of step (a) of the method according to the invention comprises the sub-steps of:
$a_3$) preparing a first mixture comprising the water notably as defined earlier, the phosphate source notably as defined earlier, the boron source notably as defined earlier and the lithium salt notably as defined earlier; and
$a'_3$) adding the magnesium source in the oxidized state notably as defined earlier and the filler notably as defined earlier, to the mixture prepared during step ($a_3$).

A fourth alternative of step (a) of the method according to the invention comprises the sub-steps of:
$a_4$) preparing a first mixture comprising the water notably as defined earlier and the phosphate source notably as defined earlier; and
$a'_4$) adding the magnesium source in the oxidized state notably as defined earlier, the boron source notably as defined earlier, the lithium salt notably as defined earlier and the filler notably as defined earlier, to the mixture prepared during step ($a_4$).

During the sub-steps ($a_1$), ($a_2$), ($a_3$) and ($a'_4$) of the method according to the invention, the boron source and the lithium salt applied may appear as a powder or a liquid. These steps therefore consist of dissolving or diluting the boron source and the lithium salt in the mixing/batching water (sub-steps ($a_1$) and ($a_3$)) or of dry mixing the boron source and the lithium salt with the other dry elements (sub-steps ($a_2$) and ($a'_4$)). These elements are advantageously added one after the other into the water or into the dry mixture (lithium salt and then boron source or boron source and then lithium salt) or are added simultaneously.

During sub-steps ($a'_1$), ($a_2$), ($a_3$), ($a'_3$), ($a_4$) and ($a'_4$) of the method according to the invention, the phospho-magnesium cement and notably the phosphate source and the magnesium source in the oxidized state and the filler applied advantageously appear as a powder. These elements are advantageously added one after the other into the water or into the dry mixture or may in certain cases be added simultaneously.

The mixing and the kneading in the method according to the invention are obtained by mixing/kneading the elements present during the step or the relevant sub-step. One skilled in the art is aware of various types of mixer/kneader which may be used during this mixing/kneading such as a grout mixer, a Guedu mixture, a high energy kneader or a kneader with planetary rotating blades particularly suitable for concretes, and will know how to choose, depending on the elements to be mixed or to be kneaded, the most appropriate mixer/kneader.

Finally, when the binder according to the invention is a mortar or a concrete, sand as defined earlier and optionally a granulate as defined earlier may be added during step (a), subsequent to step (a) or subsequent to step (b). In certain embodiments, this addition is carried out once the phosphate source, the magnesium source in the oxidized state and the filler have already been added. Alternatively, the sand and optionally the granulate may be pre-mixed with the cement.

The different steps of any of the alternatives of the method according to the invention are carried out at a temperature comprised between 5 and 35° C. and notably at room temperature (22° C.±2° C.).

The present invention further relates to the use of a composition binder as defined earlier or which may be prepared by the method as defined earlier, for confining wastes and notably nuclear wastes with low and medium activity. The nuclear wastes which may be confined in a binder according to the invention are advantageously nuclear wastes containing aluminium metal, i.e. aluminium in the state of oxidation of 0. Such wastes notably stem from the dismantlement of old nuclear installations.

This use consists of coating, conditioning or trapping these wastes in a fresh binder with a composition as defined earlier or which may be prepared by the method as defined earlier. By "fresh binder", is meant a binder having plasticity allowing such coating or trapping. The notion of fresh binder is opposed to that of a hardened binder.

When the binder is a grout or a mortar as defined earlier, it is possible to apply vibration during the confinement. Indeed, a slight vibration may be applied in the case where there exists the risk of confining air bubbles in the packet of wastes. In every case, this vibration should not last for more than 60 seconds in order to prevent any risk of exudation of the grout or of the fresh mortar.

The present invention also relates to a packet of wastes confined in a binder with the composition as defined earlier or which may be prepared by the method as defined earlier and conditioned in barrels or caissons notably metal or concrete barrels or caissons. According to this aspect, the grout or the mortar of the invention forms a confining casing surrounding the wastes and notably wastes of low and medium activity as defined earlier, i.e. nuclear wastes containing aluminium metal.

In particular, the grouts and mortars according to the invention are used for coating the wastes or for blocking them in containers, while the concretes according to the invention are mainly used for manufacturing storage containers.

Other features and advantages of the present invention will become further apparent to one skilled in the art upon reading the examples below given as an illustration and not as a limitation.

DETAILED DISCUSSION OF PARTICULAR EMBODIMENTS

1. Hydrogen Evolvement During the Coating of an Aluminium Bar with Different Cement Materials A cylindrical aluminium bar (purity of 99.99%) with a diameter of 1 cm and a height of 3 cm is coated with different types of cement materials, the characteristics of which are summarized in Table 1 hereafter.

First, the aluminium bar is immersed for 30 s in 20% sulfuric acid and then abundantly rinsed with demineralized water and dried. This operation aimed at removing any possible passivating layer at the surface of the metal.

The aluminium bar is then immersed in 50 ml of fresh material cast into a polyethylene pot, and then placed in a metal reactor, the lid of which is equipped with a tapping which allows it to be connected to a vacuum pump, to a nitrogen supply network or to a gas chromatograph. The pot is hermetically closed. A depression is produced by means of a vacuum pump until a pressure of 150 mbar is reached. Nitrogen is then introduced up to a pressure of 750 mbar.

Figure 1:
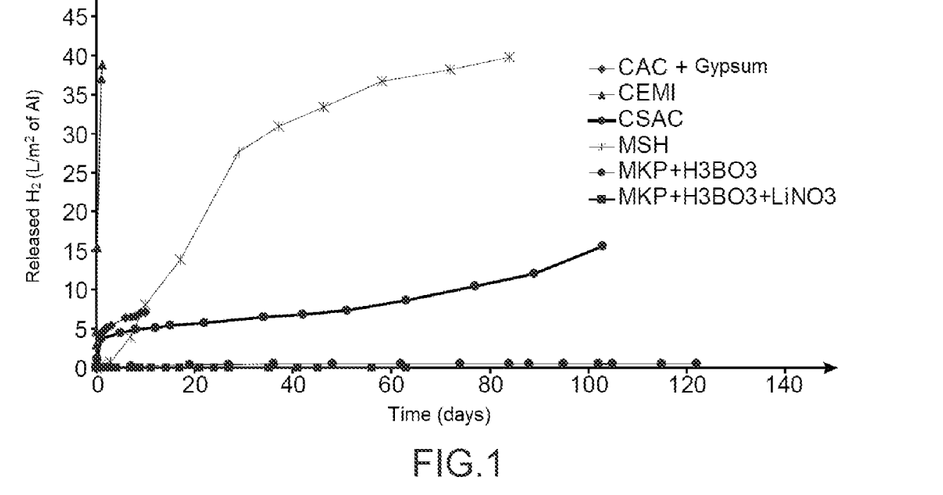
FIG. 1 shows the comparisons of the productions of hydrogen by corrosion of an aluminium bar coated with different cement materials.

The reactor is kept at room temperature (22±2° C.) and gas samples are regularly taken for hydrogen analysis by gas chromatography. FIG. 1 allows a comparison of the productions of hydrogen by the different materials.

TABLE 1

Formulation of the tested materials for coating the aluminium bar.

| Type of cement | Composition | Type of material | W/C * | Comments |
|---|---|---|---|---|
| Portland (CEM I) | CEM I 52.5 PM ES CP2 Lafarge Le Teil | Cement slurry | 0.40 | Portland Cement commonly used for inertization of wastes |
| Ettringite (CAC + gypsum) | 67% Molten aluminous cement (Kerneos) + 33% gypsum (VWR) | Cement slurry | 0.48 | Binder of the type of that tested by Savannah River [15] |
| Ettringite (CSAC) | Sulfo-aluminous cement (75% clinker KTS100 of Belitex + 25% gypsum VWR) | Cement slurry | 0.55 | Binder of the type of those studied by Hayes et al [2] |
| Silico-magnesium (MSH) | 20% MgO (MagChem 10 CR from M.A.F. Magnesite) + 5% magnesium hydroxycarbonate $4MgCO_3 \cdot Mg(OH)_2 \cdot 5H_2O$ (VWR) + 25% silica fumes (Condensil S95 DM) + Boric acid (VWR) (2% based on the mass of MgO + magnesium hydroxycarbonate + $SiO_2$) + Plasticizer (BASF Glénium 51 - 1% based on mass of MgO + magnesium hydroxycarbonate + $SiO_2$) | Cement slurry | 0.35 | Binder of the type of that studied by Zhang et al [17] |
| Phospho-magnesium + boric acid (MKP + $H_3BO_3$) | MgO (MagChem 10 CR from M.A.F. Magnesite) + $KH_2PO_4$ (VWR) + alumino-siliceous flying ashes + boric acid (VWR)<br>Molar ratio Mg/P = 1<br>Molar ratio $H_2O$/Mg = 5<br>Molar ratio B/Mg = 0.057 | Cement slurry | 0.51 ** | Binder of the type of those developed by Wagh et al [8-14] |
| Phospho-magnesium + boric acid + lithium nitrate (MKP + $H_3BO_3$ + $LiNO_3$) | MgO (MagChem 10 CR from M.A.F. Magnesite) + $KH_2PO_4$ + alumino-siliceous flying ashes (FA) + boric acid (VWR) + $LiNO_3$ (VWR)<br>Molar ratio Mg/P = 1<br>Molar ratio $H_2O$/Mg = 5<br>Mass ratio FA/(MgO + $KH_2PO_4$) = 1<br>Molar ratio B/Mg = 0.057<br>Molar ratio Li/Mg = 0.051 | Cement slurry | 0.51 ** | Present invention |
| Phospho-magnesium + boric acid + lithium nitrate (MKP + $H_3BO_3$ + $LiNO_3$) | MgO (MagChem 10 CR from M.A.F. Magnesite) + $KH_2PO_4$ (VWR) + alumino-siliceous flying ashes (FA) + boric acid (VWR) + $LiNO_3$ (VWR) + siliceous sand (Sifraco NE34)<br>Molar ratio Mg/P = 1<br>Molar ratio $H_2O$/Mg = 5.4<br>Molar ratio B/Mg = 0.057<br>Molar ratio Li/Mg = 0.051<br>Mass ratio FA/(MgO + $KH_2PO_4$) = 1<br>Mass ratio sand/(MgO + $KH_2PO_4$) = 1 | Mortar | 0.55 ** | Present invention |

* water/cement mass ratio
** water/(MgO + $KH_2PO_4$) mass ratio

As expected, the hydrogen production from the reference coating prepared from Portland cement is massive. The test had to be interrupted after only one day because of the too high content of hydrogen in the reactor.

With aluminous or sulfo-aluminous cements, evolvement of hydrogen is rapid for the first days following the mixing and then slows down. However, no stabilization is observed over the duration of the study. Resumption of the production of hydrogen even occurs after 60 d in the case of sulfo-aluminous cement. The latter is related to the depletion of gypsum in the cement slurry, which is accompanied by an increase in the pH of the interstitial solution by one unit (from about 11 to 12) and therefore by an increase in the corrosion rate of the aluminium.

In the case of silico-magnesium cement, the hydrogen evolvement remains small for the first 24 hours, and then significantly increases. The limit of 4% of hydrogen in the headspace of the reactor is attained after 90 d.

The best results are obtained with phospho-magnesium cement. With the existing formulations (curve <<MKP+ H3BO3>> of FIG. 1), a slight production of hydrogen is nevertheless detected. Extrapolation over one year would lead to a production of 0.026 L/($m^2 \cdot yr$). The present invention allows an improvement in this result. Aluminium bars were coated with the mortar according to the present invention or with a simplified formulation by suppressing sand (a slurry, the cement of which has the same composition as the mortar, the same additives, suppression of the sand, and reduction in the water content for preventing bleeding). In both cases, the hydrogen content in the gas headspace of the reactor remains lower than the detection limit of the analysis method used (0.01% of $H_2$) over the whole duration of the study (curve <<MKP+H3BO3+LiNO3>> of FIG. 1). Extrapolation over one year would lead to a hydrogen production of less than $2.28.10^{-4}$ L/($m^2 \cdot$yr), i.e. reduced by a factor of more than 100 as compared with the state of the art.

2. pH of the Interstitial Solution of the Mortar According to the Present Invention A mortar was prepared according to the formulation described in the last line of Table 1. Its interstitial solution was extracted by pressing after 1 hour of preservation at 20° C. in a hermetically closed pot. The pH of the extracted solution was measured with a pH electrode calibrated beforehand between 4 and 7. A value of 5.0 was obtained. This result confirms that the present invention gives the possibility of obtaining a material, for which the pH of the interstitial solution at an early stage is located in the range of passivation of aluminium.

3. Synergistic Effect of Boric Acid and of Lithium Nitrate for Retarding the Setting of the Phospho-Magnesium Cement In order to evaluate the influence of the additions (boric acid and lithium nitrate) on the reaction kinetics of the binder, tests were conducted on simplified formulations consisting of cement slurries. As compared with the material described in the present invention, only sand was suppressed.

The setting time of the materials was evaluated by means of an automatic Vicat setting-time-meter. Table 2 shows the different tested configurations and the obtained results.

4. Properties of a Mortar Elaborated According to the Present Invention

A mortar was prepared according to the formulation described in the last line of Table 1 by means of a standardized laboratory kneader according to the EN196:1 standard. It was then subject to the following characterizations:
- measurement of the exuded water after 1 h, 3 h and 24 h per 100 ml of coating introduced into a graduated test tube and protected from drying,
- evaluation of the fluidity by measurement of the flow time of a liter of mortar through a Marsh cone provided with a fitting of 12.5 mm,
- measurement of the heating-up of 1,575 g of mortar placed in a Langavant semi-adiabatic calorimeter,
- measurement of the initial and final setting times by means of an automatic Vicat setting-time-meter,
- measurement of the compressive strength of specimens 4×4×16 cm kept for 28 d at room temperature in water or in a bag.

Figure 2:
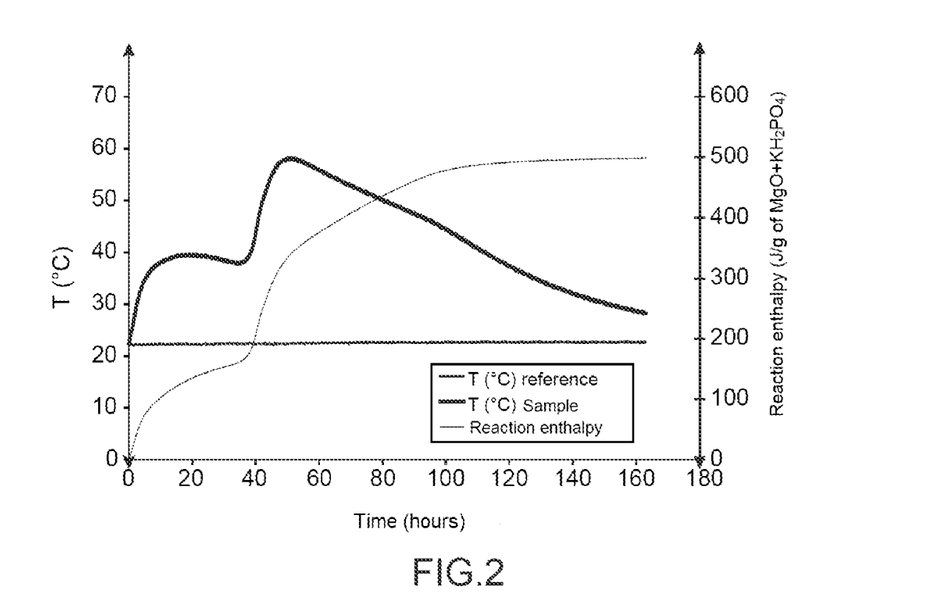
FIG. 2 shows the heating and reaction heat of a mortar elaborated according to the present invention (reaction enthalpy relatively to the mass of $MgO+KH_2PO_4$).

The obtained results are summarized in Table 3 and in FIG. 2.

TABLE 3

Properties of a mortar prepared according to the present invention.

| Property | Result |
| --- | --- |
| Exuded water | 1 h: 0% |
|  | 3 h: 0% |
|  | 24 h: 0% |
| Flow time of one liter of mortar through the Marsh cone | 80 s |
| Vicat setting time | Initial: 4 h |
|  | Final: 12 h 30 min |

TABLE 2

Study of the influence of lithium nitrate and boric acid on the setting time of phospho-magnesium cement slurries.

| Constituents and suppliers | Molar ratio Mg/P | Molar ratio $H_2O$/Mg | Mass ratio FA/(MgO + $KH_2PO_4$) | Molar ratio B/Mg | Molar ratio Li/Mg | Vicat setting time Initial (min) | Vicat setting time Final (min) |
| --- | --- | --- | --- | --- | --- | --- | --- |
| MgO Magchem 10CR (M.A.F Magnesite) $KH_2PO_4$ (VWR) Flying ashes Al—Si $H_3BO_3$ (VWR) $LiNO_3$ (VWR) | 1 | 5 | 1 | 0 | 0 | 40 (±5) | 70 (±5) |
|  |  |  |  | 0 | 0.051 | 35 (±5) | 70 (±5) |
|  |  |  |  | 0 | 0.102 | 30 (±5) | 70 (±5) |
|  |  |  |  | 0.057 | 0 | 250 (±15) | 1080 (±15) |
|  |  |  |  | 0.057 | 0.051 | 420 (±15) | 1260 (±15) |
|  |  |  |  | 0.057 | 0.102 | 690 (±15) | 2400 (±15) |

It appears that:
- used alone, lithium nitrate does not have any significant influence on the setting of the phospho-magnesium cement in the studied range of concentrations,
- used alone, boric acid has a retarding effect on the setting of the phospho-magnesium cement in the studied range of concentrations,
- the retarding action of boric acid is reinforced by adding lithium nitrate.

This result underlines the original feature of the present invention, the synergistic action of nitric acid and of lithium borate cannot be simply inferred from the influence of both of these salts considered separately from each other.

TABLE 3-continued

Properties of a mortar prepared according to the present invention.

| Property | Result |
| --- | --- |
| Maximum heating-up under the Langavant semi-adiabatic conditions | 35.7° C. |
| Reaction enthalpy (J/g de MgO + $KH_2PO_4$) | 499 J/g |
| Compressive strength at 28 d (MPa) | Bag: 46 MPa |
|  | Water: 36 MPa |

It appears that, in addition to its capability of strongly limiting corrosion of the aluminium, the mortar prepared according to the present invention has favorable features for an application to the immobilization of heterogeneous wastes:

it does not exhibit any bleeding, its reactivity is under control (initial setting time of more than 3 h, final setting time of less than 24 h), its fluidity allows flow through the Marsh cone, its heating-up remains moderate (maximum temperature of less than 60° C. under the semi-adiabatic conditions of the Langavant test), its compressive strength considerably exceeds the required minimum limit of 20 MPa at the deadline of 28 d.

REFERENCES

[1] Zhou et al, 2006, <<An Alternative to Portland Cement for Waste Encapsulation—The Calcium Sulfoaluminate Cement System>>, J. Hazard. Mater., Vol. 136, pages 120-129.

[2] Hayes and Godfrey, 2007, <<Development of the Use of Alternative Cements for the Treatment of Intermediate Level Waste>>, Proc. Waste Management 2007 (WM '07) Conference, Tucson, USA.

[3] Glasser and Zhang, 1998, <<Calculation of Chemical Water Demand for Hydration of Calcium Sulfoaluminate Cement>>, Proc. 4$^{th}$ International Symposium on Cement and Concrete, Shanghai, China, pages 38-44.

[4] Langton et al, 2011, <<Use of Cementitious Materials for SRS Reactor Facility in-situ Decommissioning>>, Proc. Waste Management (WM '11) 2011 Conference, Phoenix, USA.

[5] U.S. Pat. No. 4,756,762 in the name of American Stone-Mix, Inc., published on Jul. 12, 1988.

[6] Soudée and Pera, 2000, <<Mechanism of setting reaction in magnesia-phosphate cements>>, Cem. Concr. Res., Vol. 30, pages 315-321.

[7] Odler, 2000, <<Special inorganic cements, Modern concrete technology series>>, Taylor & Francis, London, pages 216-224.

[8] U.S. Pat. No. 5,645,518 in the name of University of Chicago, published on Jul. 8, 1997.

[9] U.S. Pat. No. 6,133,498 in the name of US Department of Energy, published on Oct. 17, 2000.

[10] International application WO 97/34848 in the name of University of Chicago, published on Sep. 25, 1997.

[11] U.S. Pat. No. 5,846,894 in the name of University of Chicago, published on Dec. 8, 1998.

[12] U.S. Pat. No. 6,153,809 in the name of US Department of Energy, published on Nov. 28, 2000.

[13] International application WO 2004/075207 in the name of University of Chicago, published on Sep. 2, 2004.

[14] Wagh et al, 1997, <<Stabilization of contaminated soil and wastewater with chemically bonded phosphate ceramics>>, Proc. Waste Management 1997 (WM '97), Tucson, USA.

[15] Langton et al, 2011, <<Use of cementitious materials for SRS reactor facility in-situ decommissioning>>, Proc. Waste Management (WM '11) 2011 Conference, Phoenix, USA.

[16] Covill et al, 2011, <<Development of magnesium phosphate cements for radioactive waste>>, Adv. Applied Ceramics, Vol. 110, pages 151-156.

[17] Zhang et al, 2011, <<Development of low pH Systems Forming Magnesium Silicate Hydrate (M-S-H)>>, Cem. Concr. Res., Vol. 41, pages 439-442.

[18] Matsuo et al, 1995, <<LiNO$_3$ addition to prevent hydrogen gas generation from cement-solidified aluminium wastes>>, J. Nucl. Sci. Techn., Vol. 32, pages 912-920.

The invention claimed is:

1. A binder composition comprising:
   (i) a phospho-magnesium cement;
   (ii) a boron source;
   (iii) a lithium salt; and
   (iv) water.

2. The composition according to claim 1, wherein said phospho-magnesium cement consists of a magnesium source in the oxidized state and of a phosphate source.

3. The composition according to claim 2, wherein said magnesium source in the oxidized state is selected from the group consisting of magnesium oxide (MgO), magnesium hydroxide (Mg(OH)$_2$), magnesium carbonate (MgCO$_3$), magnesium hydroxycarbonate (4MgCO$_3$.Mg(OH)$_2$.5H$_2$O) and one of their mixtures.

4. The composition according to claim 2, wherein said phosphate source is selected from the group consisting of phosphoric acid, aluminium phosphate, sodium phosphate, potassium phosphate, aluminium monohydrogenphosphate, sodium monohydrogenphosphate, potassium monohydrogenphosphate, aluminium dihydrogenphosphate, sodium dihydrogenphosphate, potassium dihydrogenphosphate and one of their mixtures.

5. The composition according to claim 1, wherein said boron source is selected from the group consisting of boric acid, metaboric acid, borax, a borate salt, a monohydrogenborate salt, a dihydrogenborate salt, a metaborate salt, a polyborate salt and one of their mixtures.

6. The composition according claim 1, wherein said lithium salt is selected from the group consisting of lithium nitrate, lithium carbonate, lithium sulfate, lithium phosphate, lithium triazole, lithium borate, lithium monohydrogenborate, lithium dihydrogenborate, lithium metaborate, lithium polyborate and one of their mixtures.

7. The composition according to claim 1, wherein in said composition:
   the molar ratio between the elements Mg and P is between 0.5 and 1.5;
   the molar ratio between the elements B and Mg is between 0.03 and 0.3;
   the molar ratio between the elements Li and Mg is between 0.02 and 0.12; and
   the molar ratio between water and the element Mg is between 4 and 7.

8. The composition according to claim 1, wherein said composition comprises a filler.

9. The composition according to claim 8, wherein said filler a siliceous filler.

10. The composition according to claim 1, wherein said composition further comprises sand and optionally granulates.

11. The composition according to claim 7,
    wherein the molar ratio between the elements Mg and P is between 0.8 and 1.

12. The composition according to claim 7,
    wherein the molar ratio between the elements B and Mg is between 0.05 and 0.15.

13. The composition according to claim 7,
    wherein the molar ratio between the elements Li and Mg is between 0.05 and 0.10.

14. The composition according to claim 7,
    wherein the molar ratio between water and the element Mg is between 5 and 6.

15. The composition according to claim 9, wherein said siliceous filler is an alumino-siliceous filler.

16. The composition according to claim 15, wherein said alumino-siliceous filler is a filler, either natural or not, stemming from pozzolan, illite, opaline, cherts, volcanic ashes, pumice stone, schistous clays, calcined diatomaceous earths, baked clay, silica fume or fly ash.

17. A binder composition, comprising:
  (i) a phospho-magnesium cement;
  (ii) a boron source;
  (iii) a lithium salt; and
  (iv) water, wherein said binder composition is selected from among
    a grout composition formed with
      (i) a phospho-magnesium cement formed with magnesium oxide calcined between 1,000 and 1,500° C., with a specific surface area of less than 1 $m^2/g$ and with potassium dihydrogenphosphate;
      (ii) boric acid;
      (iii) lithium nitrate;
      (iv) a filler consisting of alumino-siliceous fly ash; and
      (v) water;
    a mortar composition formed with
      (i) a phospho-magnesium cement formed with magnesium oxide calcined between 1,000 and 1,500° C., with a specific surface area of less than 1 $m^2/g$ and with potassium dihydrogenphosphate;
      (ii) boric acid;
      (iii) lithium nitrate;
      (iv) a filler consisting of alumino-siliceous fly ash;
      (v) water; and
      (vi) siliceous sand with a grain size of less than 2 mm; and
    a concrete composition formed with:
      (i) a phospho-magnesium cement formed with magnesium oxide calcined between 1,000 and 1,500° C., with a specific surface area of less than 1 $m^2/g$ and with potassium dihydrogenphosphate;
      (ii) boric acid;
      (iii) lithium nitrate;
      (iv) a filler consisting of alumino-siliceous fly ash;
      (v) water;
      (vi) siliceous sand with a grain size of less than 2 mm; and
      (vii) a siliceous granulate.

18. A method for preparing a binder composition, comprising the steps of:
  a) preparing a mixture comprising water, a boron source, a lithium salt, phosphorus-magnesium cement, and a filler; and
  b) kneading the obtained mixture subsequently to said step (a).

19. The method according to claim 18, wherein sand and optionally granulates are added during said step (a), subsequent to said step (a) or subsequent to said step (b).

20. The method of claim 18, further comprising confining nuclear wastes containing aluminium metal.

21. Packages of wastes confined in a binder with a composition comprising water, a boron source, a lithium salt, and phosphorus-magnesium cement, and conditioned in barrels or caissons.

\* \* \* \* \*